(12) United States Patent
Lacroix et al.

(10) Patent No.: US 8,801,071 B2
(45) Date of Patent: Aug. 12, 2014

(54) FASTENING DEVICE FOR A PANEL ELEMENT OF A MOTOR VEHICLE BODY

(75) Inventors: Joachim Lacroix, Flonheim (DE); Joerg Schneider, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 18 days.

(21) Appl. No.: 13/474,406

(22) Filed: May 17, 2012

(65) Prior Publication Data

US 2012/0292944 A1 Nov. 22, 2012

(30) Foreign Application Priority Data

May 20, 2011 (DE) .......................... 10 2011 106 225

(51) Int. Cl.
*B62D 27/06* (2006.01)
(52) U.S. Cl.
USPC ............................................ 296/29; 296/192
(58) Field of Classification Search
USPC ....................... 296/29, 192, 191, 193.09, 201
See application file for complete search history.

(56) References Cited

U.S. PATENT DOCUMENTS

| 4,679,845 | A | * | 7/1987 | Detampel et al. ............. 296/192 |
| 4,707,020 | A | * | 11/1987 | Enokida et al. ............... 296/191 |
| 5,098,765 | A | * | 3/1992 | Bien ............................. 428/134 |
| 5,692,953 | A | | 12/1997 | Bell et al. |

FOREIGN PATENT DOCUMENTS

| DE | 102004052172 A1 | 5/2006 |
| DE | 102005033030 A1 | 1/2007 |
| DE | 102007024565 A1 | 2/2008 |

OTHER PUBLICATIONS

German Patent Office, German Search Report for Application No. 102011106225.8, dated Mar. 6, 2012.

* cited by examiner

*Primary Examiner* — H Gutman
(74) *Attorney, Agent, or Firm* — Ingrassia Fisher & Lorenz, P.C.

(57) ABSTRACT

A fastening device is provided for the releasable fastening of a panel element to the front wall structure of a motor vehicle body, with a brace, which on one end can be fastened with a fastening structure of the panel element and on the other end can be fastened with a fastening structure of the front wall structure. The brace is releasable and positively fastened to at least one of the fastening structures with at least one end section.

11 Claims, 4 Drawing Sheets

A-A

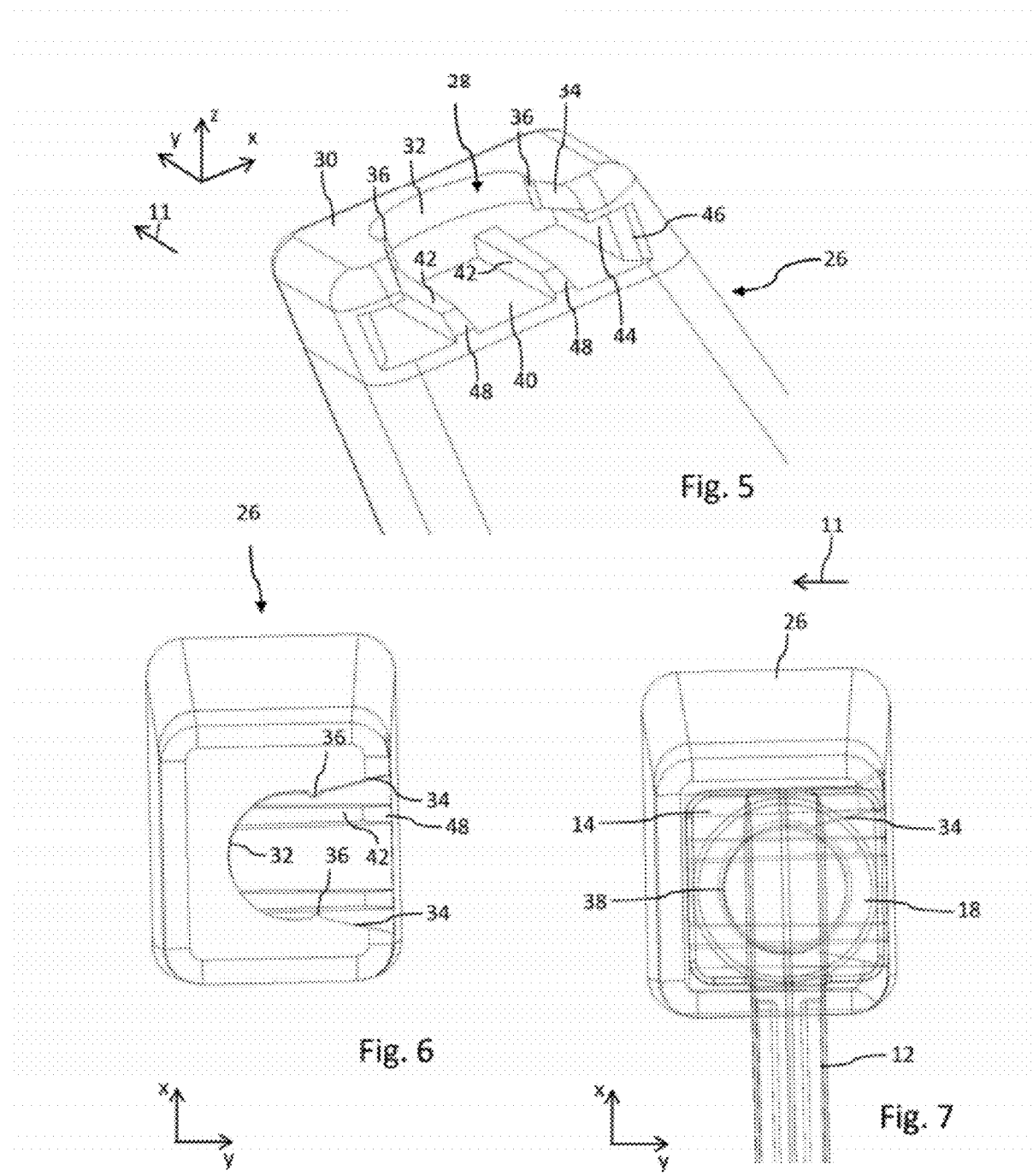

FASTENING DEVICE FOR A PANEL ELEMENT OF A MOTOR VEHICLE BODY

CROSS-REFERENCE TO RELATED APPLICATION

This application claims priority to German Patent Application No. 10 2011 106 225.8, filed May 20, 2011, which is incorporated herein by reference in its entirety.

TECHNICAL FIELD

The technical field relates to a fastening device for a panel element designed as service panel for arrangement on a water box in the front wall region of a motor vehicle body.

BACKGROUND

On an upper end section of a front wall of a motor vehicle body separating the vehicle interior and the engine compartment from each other, a water box typically protruding forward in driving direction of the vehicle is fastened. Typically it extends between the spring strut mountings of the motor vehicle body. The water box serves in particular for the fastening and connecting of function components, such as for example the windshield wiper linkage or the windshield wiper motor.

In an extension protruding forward in a driving direction, a panel element commonly described as service panel is arranged on the water box formed of sheet metal, which fills out the remaining gap between water box and engine hood. For service or maintenance purposes, the panel element can be disassembled and removed in order to create an access possibility to the function components arranged below the water box or on the water box.

Typically, the panel element can be fastened to the water box with a fastening edge facing the water box. To this end, a number of fastening points are provided along the fastening edge, to which the panel element can be screwed for example to the water box. Since the panel element, seen in vehicle transverse direction (y) can almost fill out the entire installation space between the spring strut mountings on the body side and because of the contour of the adjoining water box sometimes hardly receives any stabilizing support on the outlying lateral edges, it is desirable to structurally strengthen and accordingly improve the fastening for the panel element on the front wall region of the motor vehicle body.

In this regard, it is at least one object to provide an improved fastening device for the releasable fastening of a panel element to the front wall structure of a motor vehicle body. The fastening device is to make possible a simple assembly and disassembly of the panel element on the front wall structure. If possible, it should be implementable in an existing installation space concept of a motor vehicle and be equally suitable in particular for multiple assembly and disassembly. In addition, other objects, desirable features and characteristics will become apparent from the subsequent summary and detailed description, and the appended claims, taken in conjunction with the accompanying drawings and this background.

SUMMARY

The claimed fastening device is designed for the releasable fastening of a panel element to the front wall structure of a motor vehicle body. The fastening device to this end comprises a brace, which with one end can be fastened to a fastening structure of the panel element and with the other end to a fastening structure of the front wall structure. The brace in this case can be releasably and positively fastened with at least one end section to at least one of the fastening structures of the fastening structures of the panel element and/or of the front wall structure.

By means of the brace, a region of the panel element in particular located approximately in the middle with respect to the vehicle transverse direction (y) can be subjected to a structural strengthening, consequently be subjected to a support absorbing tensile and/or compressive loads. Since the panel element is preferably designed as plastic injection-molded body or as plastic molding, a possible bending-through of the panel element can be largely prevented in this manner.

The brace is preferably designed as a tensile brace absorbing a tensile force. It extends, in particular, above the panel element and prevents the bending-through or folding-away downwards of the panel element.

In particular, the tensile brace can apply an upwardly directed mechanical tension on a front end section of the panel element. Accordingly, the panel element can come to bear against the bottom side of an engine hood with an adequate sealing effect even in a, regarding the vehicle transverse direction, middle region.

The brace can be releasably and positively fastened either to the panel element or to the front wall structure, in particular can be positively fastened to a support for a windshield arranged above a water box. In this manner, the brace can also be transferred into a release position even without the help of tools if required during a service, in which if required further connecting points, such as for example screw connections of the panel element can be disconnected, finally the entire panel element removed from the front wall structure.

The releasable and positive fastening of the tensile brace to the front wall structure and/or to the panel element furthermore makes it possible to re-fasten the panel element in its original position on the front wall structure of the motor vehicle body for example after completion of maintenance operations. The positive connection of the at least one end section of the brace in this case is configured such that it can be both released in a non-destructive manner as well as restored if required.

According to another embodiment, it is provided that the brace with its end section facing the panel element is designed for forming a releasable engagement connection with a fastening element provided on the panel element. The fastening structure on the panel side in this regard is substantially formed by the fastening element. The fastening element and the end section of the tensile brace facing the panel element are furthermore geometrically matched to each other for forming a releasable positive connection.

On the other end, the brace according to a further embodiment, comprises a spreader pin or spreader mandril substantially protruding perpendicularly to the longitudinal extension of the brace on its end section facing the front wall structure, which upon reaching of an assembly position on the motor vehicle body penetrates a passage opening provided in the front wall structure, in particular in the windshield support. The spreader pin designed approximately arrow-shaped in cross section in this case serves for a non-releasable yet pivotable fastening of the brace to the front wall structure. Thus, the spreader pin comprises barbs or straps standing away in an approximately radial manner to the outside, which upon reaching of a configuration that penetrates the passage opening, radially spread outwardly and prevents a retraction of the spreader pin through the passage opening of the windshield support. With the non-releasable positive fastening of the brace to the front wall structure, the brace remains on the motor vehicle body even in a configuration released from the panel element and cannot be lost during service or maintenance operations.

Designing the spreader pin on the brace furthermore makes possible an initial assembly of the brace without the help of any tools. The spreader pin furthermore comprises a radially-symmetrical configuration, so that an unchangeable fastening in any pivot position relative to the front wall structure is possible.

According to another embodiment, the fastening element provided on the panel element is unitarily connected to the panel element or it is unitarily integrated in the latter. In particular, in the case of an embodiment of the panel element as plastic injection-molded component the fastening element can be integrated almost cost-neutrally in the panel element or provided on the panel element. The panel element can also comprise a structural reinforcement, for example in the shape of at least regional glass fiber reinforcement in particular in the region of the fastening element.

The fastening element can be designed as a fastening protrusion or fastening dome standing out from the plane of the panel element. A fastening element which at least slightly stands out from the surface of the panel element sometimes facilitates the releasing and the repeated fastening of the brace to the fastening element.

In a further embodiment, the fastening element furthermore comprises a receptacle for a fastening head of the brace facing the panel element. In particular, the fastening head of the brace can be engagingly inserted or clipped into the receptacle of the fastening element. Alternatively to this it is obviously also conceivable that the fastening element on the panel element side comprises a fastening head and the brace a receptacle corresponding thereto for forming a positive connection.

Independently, it is furthermore provided according to another embodiment that the receptacle predetermines an insertion direction for the fastening head that substantially runs perpendicularly to the longitudinal extension of the brace. Since the brace on the other hand is preferably pivotably articulated on the vehicle body, the receptacle of the fastening element is oriented in such a manner that the head of the brace facing the panel element can be inserted in the receptacle of the fastening element following the pivot direction.

Here it is provided in particular that the brace on reaching a final assembly configuration substantially extends in vehicle longitudinal direction (x) and/or in vehicle vertical direction (z). For releasing the brace and for releasing the panel element it is provided in particular that the brace with its head is laterally, i.e., in vehicle transverse direction, pivoted out of the receptacle.

According to another embodiment, the fastening head of the brace furthermore comprises an annular groove, which can be releasably clipped into a corresponding recess of an end face of the fastening element in the manner of a segment of a circle. On reaching a fastening configuration, the annular groove of the fastening head on the brace side is enclosed, seen in circumferential direction, by at least, preferably by more than about 180° by the segment-like recess of the fastening element. The recess in this case furthermore forms a lateral stop for the annular groove for the fastening head and in this respect provides a limitation for the pivot movement of the brace.

As a further embodiment it is provided that the recess comprises at least one engagement protrusion radially protruding to the inside. Advantageously, in this case, a plurality, in particular two engagement protrusions located opposite each other are provided, which on the segment-like recess or indentation of the end face are spaced from each other by at least about 180° or more. The engagement protrusions protruding to the inside in this respect form an undercut for the annular groove preferably of round design.

In particular, when the panel element and its fastening element as well as the brace and its head are produced from plastic materials, the clear spacing between opposing engagement protrusions of the fastening element can be designed at least slightly smaller than the diameter of the annular groove of the brace head. The forming or releasing of an engagement of fastening head and fastening element on the panel element side in this case can be accompanied by a minor elastic deformation of the fastening element and/or of the brace head and its annular groove.

Since the receptacle of the fastening element is preferably oriented to the side, i.e., in vehicle transverse direction (y), but the brace preferably extends in vehicle longitudinal direction (x) in final assembly configuration, the brace can in particular transmit tensile or compressive forces between the front wall structure and the panel element which spread in vehicle longitudinal direction. In that the fastening direction for the brace runs at least obliquely, preferably perpendicularly to its longitudinal direction, no forces worth mentioning occur in continuous operation of the motor vehicle in vehicle transverse direction on the fastening element, which could otherwise result in a spontaneous releasing of the connection of brace and panel element.

According to a further embodiment it is provided furthermore that the fastening head adjoining the annular groove comprises a radially widened flange that can be inserted in the receptacle of the fastening element, which upon reaching of an assembly position bears against a bottom side of the end face of the fastening element. The radially widened flange insofar prevents an upwardly directed pulling-off of the brace head from the fastening element. It causes, furthermore, a fixing of the brace perpendicularly to the brace longitudinal direction as well as perpendicularly to the insertion direction in the receptacle or perpendicularly to the pivot direction. In addition, the flange extends, based on the pivot or rotary axis of the brace, axially offset or axially adjoining to the annular groove.

In a further embodiment it can be provided furthermore that the receptacle for the fastening head, in particular for its radially widened flange, on a bottom section comprises at least one clamping web with a starting bevel substantially extending parallel to the insertion direction. The bottom section and the clamping web provided thereon in this case are designed in such a manner that the spacing in axial direction between the clamping web and the bottom side of the front wall of the fastening element approximately corresponds to the thickness of the flange in axial direction.

Because of this arrangement, the fastening head of the brace on reaching of a final assembly position can be clamped in between the clamping web and the end face or the front wall of the fastening element. The starting bevel of the at least one clamping web, which is oriented facing the receptacle opening, can facilitate the inserting and positioning of the flange of the fastening head.

According to an embodiment, a panel element is provided for connection to the front wall structure of a motor vehicle body. The panel element furthermore comprises a fastening element, which is designed for forming a releasable positive connection with a brace that can be fastened to the front wall structure on the other end. The brace in this case is preferably pivotably fastened to the front wall structure, in particular to a windshield support of the motor vehicle. Here, the brace is part of a fastening device, by means of which the panel element can be positively, releasably and non-destructively fastened in particular to a water box plate.

According to a further embodiment, a motor vehicle body is additionally provided, which comprises at least one front wall, on which a water box protruding forward in driving direction and a windscreen support arranged above the water box are arranged. Here, the vehicle body furthermore comprises a panel element located in front of the water box in driving direction, preferably adjoining the front end section of a water box, which can be releasably and positively fastened to the windshield support with a brace. Here, the brace has to be positively fastened at one end to a fastening structure of the windshield support and at the other end has to be preferably releasably and positively connected to a fastening element formed on the panel element. Insofar it is provided, in particular, that the brace with its end section facing the panel element is formed in a releasably engageable manner in a fastening element provided on the panel element.

In a further embodiment, a motor vehicle is provided that comprises a previously described fastening device. The fastening device comprises at least the brace extending between panel element and front wall structure. In embodiments, the fastening device can also comprise the fastening structures that directly enter into operational connection with the brace, in particular a through-opening provided on the front wall structure and a fastening element formed on the panel element.

BRIEF DESCRIPTION OF THE FIGURES

The present invention will hereinafter be described in conjunction with the following drawing figures, wherein like numerals denote like elements, and:

FIG. 5 a perspective representation of the fastening element on the panel side;

FIG. 6 the fastening element according to FIG. 5 viewed from above;

FIG. 7 the fastening element according to FIG. 6 with a brace head fastened thereon.

DETAILED DESCRIPTION

The following detailed description is merely exemplary in nature and is not intended to limit application and uses. Furthermore, there is no intention to be bound by any theory presented in the preceding background or summary or the following detailed description.

In FIG. 1 to FIG. 4, a fastening device 10 for fastening panel element 20 to a front wall structure of a motor vehicle body is shown in various representations. On an upper end section of a motor vehicle front wall which is not explicitly shown in the figures, a water box 54 extends towards the front, in driving direction (x) of the vehicle.

Figure 3:
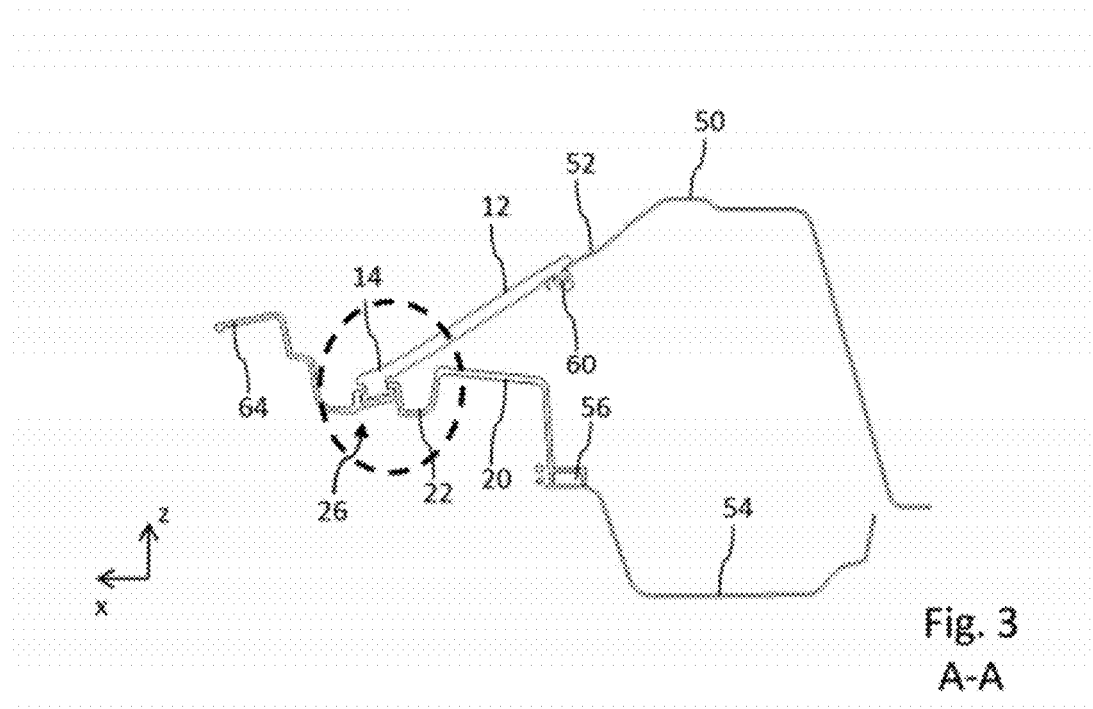
FIG. 3 a cross section along A-A of the representation according to FIG. 2.
Figure 8:
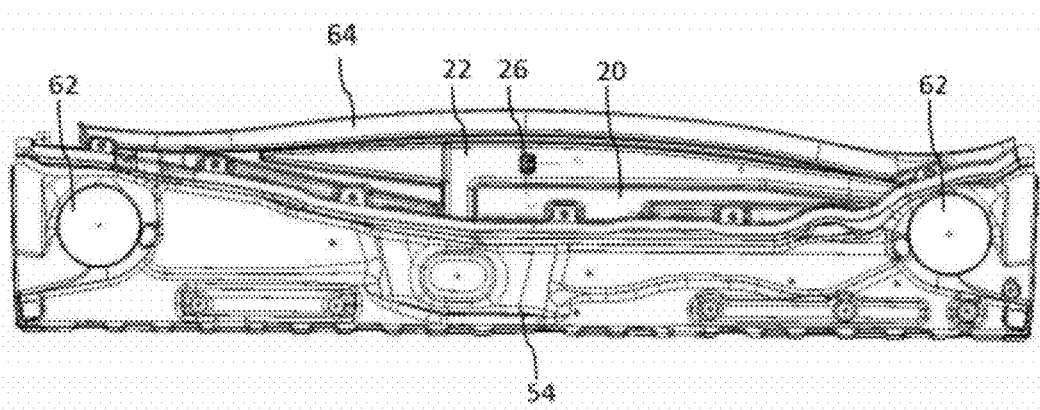
FIG. 8 a panel element fastened to a water box plate.

Viewed in driving direction, arranged upstream of the water box plate 54, a panel element or service panel 20 shown in FIG. 8 is provided, which supports itself on a front edge section of the water box plate 54 with a fastening edge 56 shown in cross section in FIG. 3. The panel element 20 only shown as detail in FIG. 1 to FIG. 4 comprises a channel structure 22, 24 designed for discharging water, by means of which water accumulating in the region of the service panel 20 can be discharged into the water box 54 located behind and lower in a controlled manner.

According to the representation according to FIG. 8, the panel element 20 extends between the laterally located spring strut mountings 62 of the water box 54. The edge 64 of the panel element 20 located in driving direction in the front and facing away from the water box 54 serves for receiving a hood seal, so that with the panel element 20 an intermediate space between water box 54 and engine hood can be almost completely sealed.

In order for the panel element not to sag through or fold away downwards even in a with respect to the vehicle transverse direction (y) middle region, the panel element 20 comprises a fastening element 26, standing away from the panel plane towards the top, approximately in the manner of a fastening dome 26. A tensile brace 12 can be hooked into the fastening element 26, which is pivotably formed on the other end on a strap 52 of a windshield support 50 located above the water box 54 for the windshield which is not explicitly shown here.

As is shown in the cross section according to FIG. 3, the brace 12 which is preferably formed of plastic is provided with a spreader pin 60 on its end section facing the windshield support 50, by means of which the brace 12 can be inserted in a through-opening formed on the strap 52. As soon as the spreader pin 60 during the assembly process penetrates the through-opening on the strap 52 provided for this purpose, it radially spreads open outwardly and prevents a disconnecting or pulling-off of the brace 12 from the windshield support 50 in the direction opposite to the insertion direction.

Figure 1:
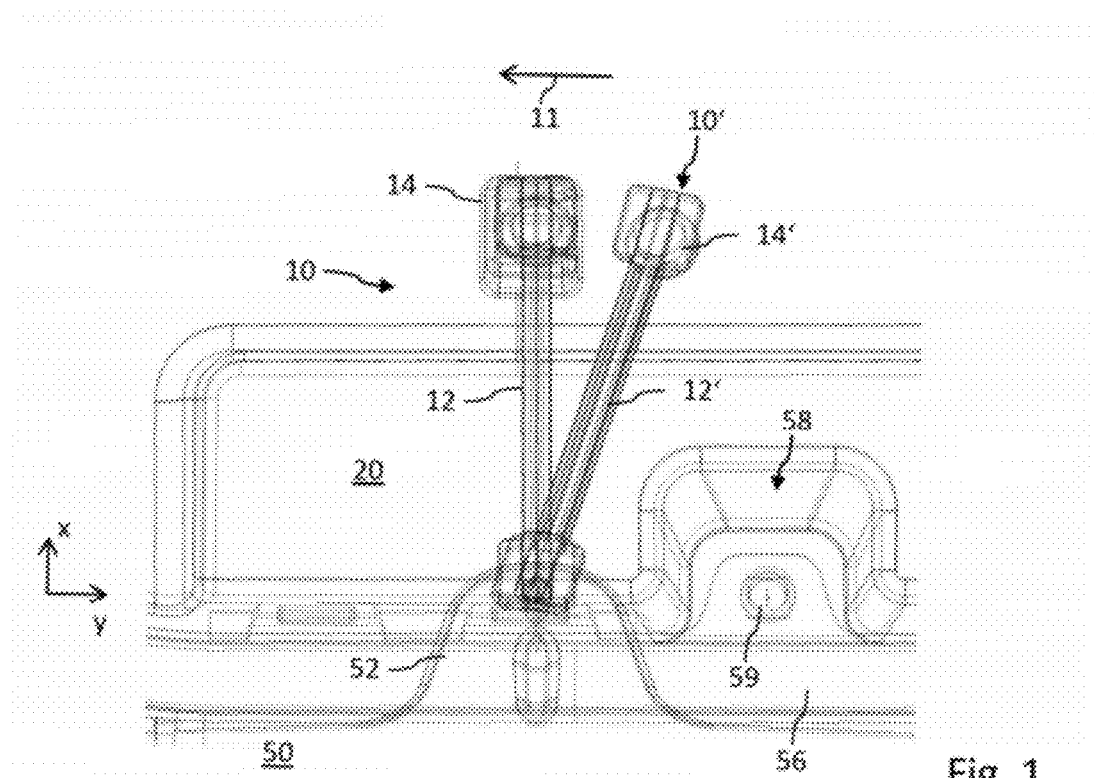
FIG. 1 a representation of the fastening device seen from above in engaged and released configuration.
Figure 2:
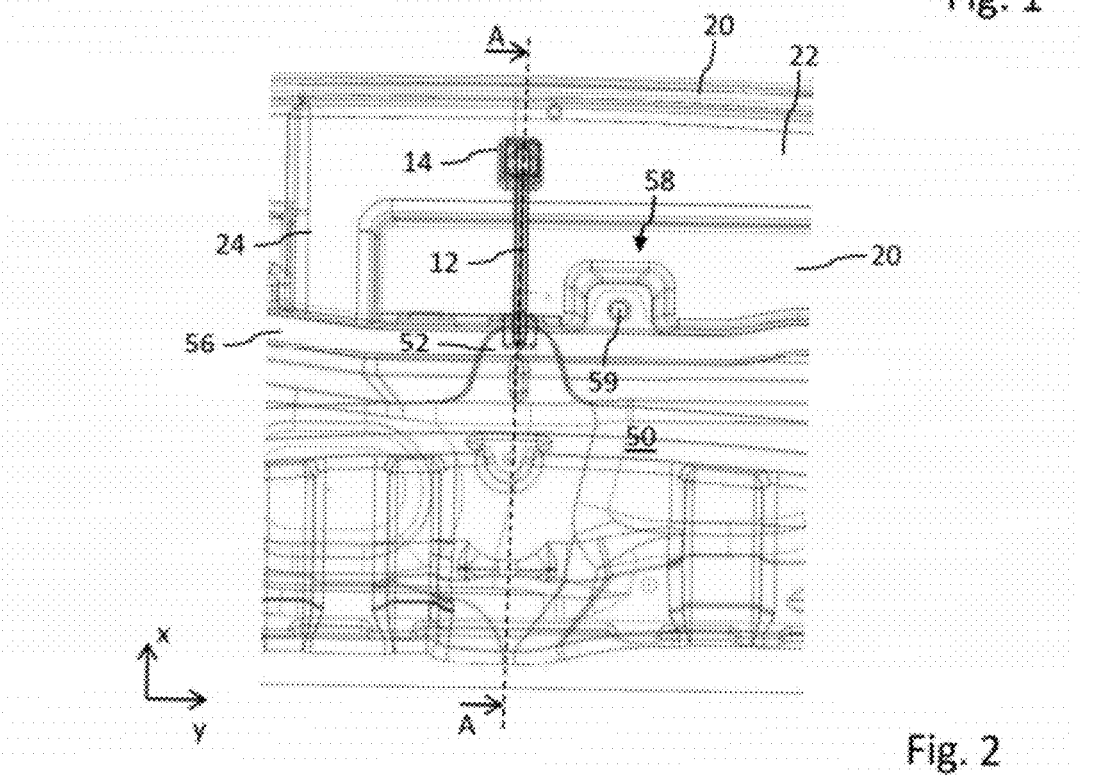
FIG. 2 the water box of a vehicle front wall and the panel element with the fastening device arranged in front thereof.

On the other end, the brace 12 comprises a fastening head 14, which the brace 12 can be positively inserted in the laterally accessible receptacle 28 of the fastening element 26 shown in perspective in FIG. 5. In FIG. 1, the insertion direction of the fastening head 14 is shown with the arrow 11. In the configuration designated 10', 12' and 14' there is located the brace 12' in a release position, while the other configuration 10, 12, 14 corresponds to a fastening configuration. In FIG. 1, furthermore, the fastening edge 56 of the panel element 20 facing the water box 54 is shown furthermore, which is provided with receptacles 58 for fastening means, for example for releasable screws 59 on a plurality of fastening points.

Figure 4:
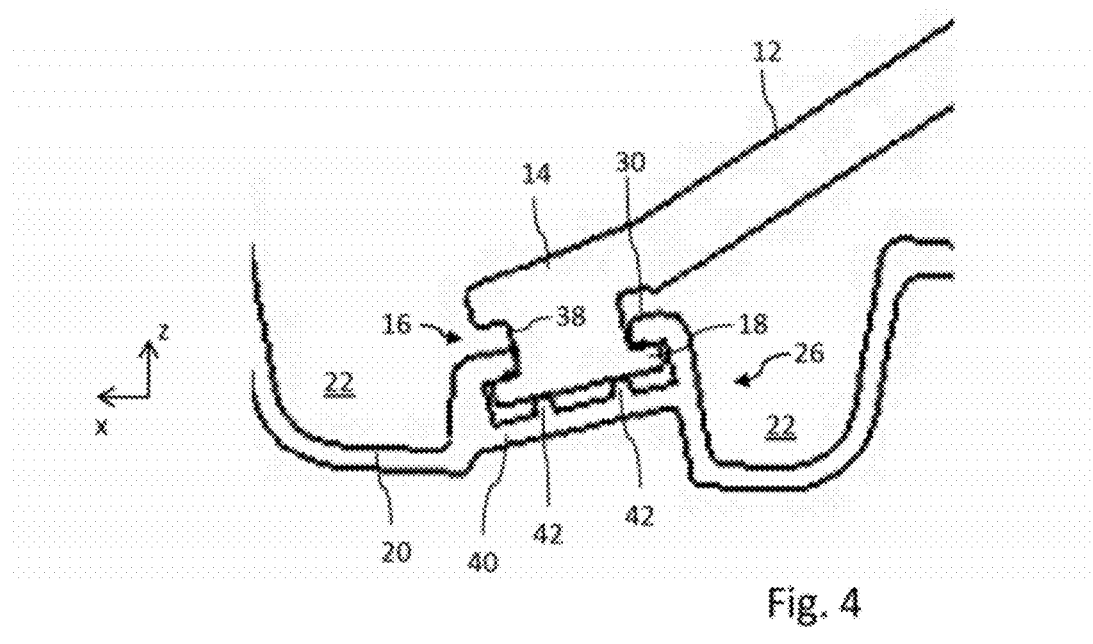
FIG. 4 an enlarged representation of the connection on the panel element side shown in FIG. 3.

In FIG. 3, and in the enlarged representation according to FIG. 4, the brace head 14 is shown in slightly more detail. The brace head 14 comprises an annular groove 16, with which it can be pushed into the receptacle 28 opened towards the side on the fastening element 26 with a radially widened flange 18 adjoining thereto. Towards the top, viewed in vehicle vertical direction (z) the receptacle 28 is limited by an end face 30, which comprises a segment-like cutout 32 that is open towards the insertion opening.

Adjoining the segment-like edge 32, engagement elements or engagement protrusions 36 radially protruding to the inside and located opposite are provided, which have a clear spacing from each other which is at least slightly smaller than the diameter of the contact surface 38 of the annular groove 16 of the fastening head 14 of the brace 12. Depending on the choice of material for the end face 30 and for the engagement protrusions 36 radially protruding towards the inside and the annular grooves 16 and its contact surface 38, different pulling-off forces meeting the respective requirements can be formed for the releasing of the positive connection. Outwardly adjoining the engagement protrusions 36, the cutout provided in the end face 30 comprises insertion bevels 34 tapering towards the inside, which simplifies the inserting of the fastening head 14 of the brace 12.

As is shown in FIG. 4 and FIG. 7, a radially widened flange section 18 of the fastening head 14 adjoining the annular groove 16 downwards in axial direction comes to lie in the receptacle 28 in assembly position. The top of the flange 18 in this case supports itself on the bottom of the end face 30 and thus prevents a pulling-off of the fastening head 14 in axial or z-direction.

In addition, the bottom 40 of the receptacle 28 facing away from the end face 30 is provided with two clamping webs 42 oriented parallel to each other and approximately extending in insertion direction 11, which towards the opening edge comprise a contact or insertion bevel 48. The clamping webs 42 can furthermore rise slightly in insertion direction 11, so that upon inserting of the radially widened flange 18 of the fastening head 14 a clamping action can be generated in axial or z-direction. The side walls 44 of the receptacle 28 can also be provided with a further insertion bevel 46 towards the receptacle edge in order to simplify the accurately positioned insertion of the fastening head 14 in the receptacle 28.

Since the receptacle 28 of the fastening element 26 provided on the panel side is embodied open in vehicle transverse direction (y), the fastening head 14 of the brace 12 can releasably engage in the receptacle 28 during the course of a pivot movement with the engagement element 60 provided as pivot access on the other end. Thus, the brace 12, even after completed final assembly, can be transferred into its release position 12' shown in FIG. 1 at any time. Any further connection, such as screws 59 provided on the fastening edge 56 can be released and the panel element 20 can be non-destructively removed from the front wall structure for example for service or maintenance purposes and reattached thereto after completed service procedure.

While at least one exemplary embodiment has been presented in the foregoing summary or detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A fastening device for a releasable fastening of a panel element to a front wall structure of a motor vehicle body, comprising:
    a brace, comprising:
        a first end that comprises: an end section that is configured to releasably and positively fasten to a first fastening structure of the panel element, wherein the end section is configured to face the panel element and to form a releasable engagement connection with the first fastening structure of the panel element, wherein the first fastening structure comprises: a receptacle for a fastening head of the brace facing the panel element, wherein the receptacle predetermines an insertion direction for the fastening head that substantially runs perpendicularly to a longitudinal extension of the brace; and
        a second end that is configured to fasten to a second fastening structure of the front wall structure.

2. The fastening device according to claim 1, wherein the brace at the end section is configured to face the front wall structure and comprises a spreader pin, which in assembly position penetrates a through-opening provided in the front wall structure.

3. The fastening device according to claim 1, wherein the fastening head comprises:
    an annular groove that is configured to releasably clip into a corresponding segment-like recess of an end face of the first fastening structure.

4. The fastening device according to claim 3, wherein the recess comprises at an engagement protrusion radially protruding to an inside.

5. The fastening device according to claim 1, wherein the fastening head adjoining to an annular groove comprises:
    a radially widened flange that is configured for insertion in the receptacle of the first fastening structure, which in assembly position bears against a bottom of an end face.

6. The fastening device according to claim 1, wherein the receptacle on a bottom section comprises at least one clamping web with a starting bevel substantially extending parallel to the insertion direction.

7. A fastening device for a releasable fastening of a panel element to a front wall structure of a motor vehicle body, comprising:
    a brace comprising:
        a first end that is configured to fasten to a first fastening structure of the panel element, wherein the first end comprises an end section configured for a releasable and positive fastening to the first fastening structure; and
        a second end that is configured to fasten to a second fastening structure of the front wall structure,
        wherein the brace is pivotably fastened to a windshield support on a front wall side.

8. A fastening device for a releasable fastening of a panel element to a front wall structure of a motor vehicle body, comprising:
    a brace comprising:
        a first end that is configured to fasten to a first fastening structure of the panel element, wherein the first end comprises:
            an end section configured for a releasable and positive fastening to the first fastening structure, wherein the end section is configured to face the panel element and forms a releasable engagement connection with the first fastening structure of the panel element; and
        a second end that is configured to fasten to a second fastening structure of the front wall structure, wherein the first fastening structure is unitarily connected to the panel element.

9. A fastening device for a releasable fastening of a panel element to a front wall structure of a motor vehicle body, comprising:
    a brace comprising:
        a first end that is configured to fasten to a first fastening structure of the panel element, wherein the first end comprises:
            an end section configured for a releasable and positive fastening to the first fastening structure, wherein the end section is configured to face the panel element and forms a releasable engagement connection with the first fastening structure of the panel element; and a second end that is configured to fasten to a second fastening structure of the front wall structure, wherein the first fastening structure is a fastening protrusion standing out from a plane of the panel element.

10. A fastening device for a releasable fastening of a panel element to a front wall structure of a motor vehicle body, comprising:
   a brace comprising:
      a first end that comprises: an end section that includes a fastening head that is configured to form a releasable engagement connection with a receptacle of a first fastening structure of the panel element to releasably and positively fasten the end section to the first fastening structure, wherein the fastening head comprises: an annular groove that is configured to releasably clip into a corresponding segment-like recess of an end face of the first fastening structure; and
      a second end that is configured to fasten to a second fastening structure of the front wall structure.

11. A fastening device for a releasable fastening of a panel element to a front wall structure of a motor vehicle body, comprising:
   a brace, comprising:
      a first end that comprises: an end section that is configured to releasably and positively fasten to a first fastening structure of the panel element, wherein the end section is configured to face the panel element and to form a releasable engagement connection with the first fastening structure of the panel element, wherein the first fastening structure comprises: a receptacle for a fastening head of the brace facing the panel element, wherein the fastening head adjoining to an annular groove comprises: a radially widened flange that is configured for insertion in the receptacle of the first fastening structure, which in assembly position bears against a bottom of an end face; and
      a second end that is configured to fasten to a second fastening structure of the front wall structure.

\* \* \* \* \*